United States Patent [19]

Oswald

[11] Patent Number: 4,838,966
[45] Date of Patent: Jun. 13, 1989

[54] WOVEN ENDLESS TIRE REINFORCING BELT AND METHOD FOR PRODUCING SAME

[75] Inventor: Richard W. Oswald, Madison, Conn.

[73] Assignee: The Armstrong Rubber Co., New Haven, Conn.

[21] Appl. No.: 929,602

[22] Filed: Nov. 12, 1986

[51] Int. Cl.$^4$ .................. B65H 81/08; B60C 9/18
[52] U.S. Cl. .................. 156/117; 152/533; 152/538; 428/108
[58] Field of Search .......... 152/533, 538, 528, 527; 156/177, 181, 175, 433, 130, 117, 397; 428/295, 108, 109; 242/26, 43.2, 178

[56] References Cited

U.S. PATENT DOCUMENTS

| | | | |
|---|---|---|---|
| 2,982,327 | 5/1961 | Vanzo et al. | 152/533 X |
| 3,550,667 | 12/1970 | Bartley et al. | 152/533 |
| 3,563,296 | 2/1971 | Wells | 152/361 |
| 3,589,426 | 6/1971 | Varner | 152/533 |
| 3,598,166 | 8/1971 | Wells | 152/533 X |
| 3,674,079 | 7/1972 | Varner | 152/361 |
| 3,706,623 | 12/1972 | Klein | 156/394 |
| 3,720,569 | 3/1973 | Kimble | 156/181 X |
| 3,729,365 | 4/1973 | Greene | 161/57 |
| 3,746,590 | 7/1973 | Bartley et al. | 156/117 |
| 3,770,042 | 11/1973 | Greene et al. | 152/533 X |
| 3,837,387 | 9/1974 | Menough et al. | 152/538 |
| 4,002,789 | 1/1977 | Klein | 428/108 |
| 4,045,990 | 9/1977 | Klein | 72/190 |
| 4,600,456 | 7/1986 | Oswald | 156/117 |

*Primary Examiner*—David Simmons
*Assistant Examiner*—Ramon R. Hoch
*Attorney, Agent, or Firm*—St. Onge Steward Johnston & Reens

[57] ABSTRACT

A woven endless tire reinforcing belt for a pneumatic tire is provided, wherein the reinforcing belt comprises a first belt portion having a width $W_1$, said first portion comprising at least one coated continuous cord reinforcement woven in a zig-zag pattern, and at least one additional belt portion having a width $W_2$, $W_2$ being substantially different from $W_1$, said additional belt portion being woven from at least one coated continuous cord reinforcement, said additional belt portion being positioned adjacent the first belt portion and substantially centered therewith, whereby said endless tire reinforcing belt has increased uniformity of stiffness from one edge to the other. Also provided is a method for weaving such a reinforcing belt.

22 Claims, 3 Drawing Sheets

WOVEN ENDLESS TIRE REINFORCING BELT AND METHOD FOR PRODUCING SAME

BACKGROUND OF THE INVENTION

1. Field of the Invention

The present invention relates to woven, endless tire reinforcement belts.

In recent years, endless woven tire reinforcement belts have been shown to provide a number of advantages over breaker belts of more conventional construction. These endless belts are woven from coated continuous reinforcement material by laying it in an ordered zig-zag pattern on the surface of a forming drum of predetermined diameter.

The present invention relates to further improvements in woven endless tire reinforcing belts and a method for producing same, the improvements concerning changing the zig-zag pattern of the endless belt weave.

2. Discussion of the Prior Art

Endless reinforcements for belted tires are known in the art. U.S. Pat. No. 3,589,426 to Varner shows an endless reinforcement for a pneumatic tire comprising continuous cord forming a generally zig-zag pattern and being positioned across the width of the reinforcement from one side to the other at an angle to the edges of the reinforcement with reversals at the edges. The relationship of the various parameters of the reinforcement is as follows:

$$\frac{C \cdot \tan \cdot A}{2 \cdot W} = \frac{EPI \cdot C \cdot D \cdot \sin A}{P \cdot M \pm 1} = GR$$

wherein C is the circumference of the reinforcement, A is the smaller angle between the cord and the edge of the reinforcement, W is the width of the reinforcement measured perpendicular to the edges, EPI is the number of cords per inch measured perpendicular to the cord lengths, P is an integer and equal to one plus the total number of interleaving lines parallel to and intermediate the edges of the reinforcement, M and D are two integers having no common factor and which render $(P \cdot M + 1/D)$ an integer with D being less than P, and D and P have no common factor, and GR is the number of repeating cycles of the cord from one edge and back to the same edge for each circumference of the reinforcement.

Varner '426 also provides that the edges of the reinforcement of the invention may be distorted by providing cord reversals at points staggered with respect to other reversal points, such that the point of reversal for a given length of cord may be closer to or farther away from the center as desired to provide a reinforcement with edges somewhat thinner than the main body of the reinforcement (column 3, lines 61-67).

U.S. Pat. No. 3,729,365 to Greene discloses a reinforcing strip 11 disposed in a zig-zag repeating pattern with succeeding lengths of the strip being displaced from each other. The reversal points or folds 12 are at the edges of the reinforcement. The Green patent also states at column 3, lines 33-42, that it may be desirable to provide a change in the angle of the strip across the width of the reinforcement, for example, by making the angle in portions of the strip adjacent the edges greater or less than the angle in the center portion. Greene does not disclose what the angles or change in angles should be, however.

U.S. Pat. No. 3,746,590 to Barley et al. shows a pneumatic tire having a belt wound from a tape wherein the successive superposed windings forming the edges of belt 14 is said to provide a build-up or greater thickness of cords for the shoulder or edge portion of the tread.

It is a disadvantage of the prior art woven belts that the cord reinforcements tend to accumulate toward the edges of the belt where the reversals occur, thereby making the belt thicker and therefore stiffer adjacent the edges than toward the center. This structure can cause uneven tread wear across the tire, with possibly greater center wear taking place than is desirable.

SUMMARY OF THE INVENTION

In accordance with the present invention, a woven endless tire reinforcing belt is provided comprising a first belt portion having width $W_1$, and at least one additional belt portion having width $W_2$. $W_2$ is different from $W_1$, and the second belt portion is placed adjacent the first belt portion to provide a belt that has a substantially uniform stiffness from one edge to the other. Both belt portions are woven in a zig-zag pattern across the belt from coated continuous cord reinforcements, each such reinforcement comprising at least one cord covered with a polymeric material such as rubber.

In accordance with another embodiment of the present invention, a woven endless tire reinforcing belt is formed by weaving at least one coated continuous cord reinforcement in a zig-zag pattern across said belt from one side to the other of said belt with a changing angle to the edges of the belt. The belt is formed with reversals at the edges. The lengths of said reinforcement between reversals is interleaved with lengths disposed at an opposite angle along at least one line substantially parallel to and intermediate the edges of said belt. The angle is greater toward the center line of the belt than toward the edges to provide a reinforcement belt having a reduced thickness at points adjacent the outer edges thereof.

In accordance with another embodiment of the present invention, a method for weaving an endless tire reinforcing belt is provided comprising the steps of supporting an endless weaving surface about at least one rotatable support member, laying a first portion of cord reinforcement onto said surface in a zig-zag pattern having a width $W_1$, and, after the first belt portion has been formed, reducing width $W_1$ to a width $W_2$ and continuing to lay said reinforcement in a similar zig-zag pattern onto the radially outward side of said first belt portion, so that the reinforcing belt has a substantially uniform stiffness from edge to edge.

One object of the present invention is to provide a woven endless tire reinforcing belt that will impart improved uniformity of treadwear pattern to a pneumatic tire using the belt.

Another object of the present invention is to provide a method for weaving a tire reinforcing belt that will impart improved uniformity of treadwear pattern to a pneumatic tire using the belt.

Yet another object of the present invention is to provide a pneumatic tire having increased dimensional uniformity.

Other objects and advantages of the present invention will become apparent from the following description of the drawings and the preferred embodiments.

BRIEF DESCRIPTION OF THE DRAWINGS

The invention will be better understood and its advantages will become more apparent when the following detailed description is read in light of the accompanying drawing wherein.

DETAILED DESCRIPTION OF THE PREFERRED EMBODIMENT

Endless woven tire reinforcement belts of the type of the present invention find utility in virtually all vehicle tires. One of the widest uses is in passenger car tires of otherwise conventional radial and bias ply construction.

Figure 1:
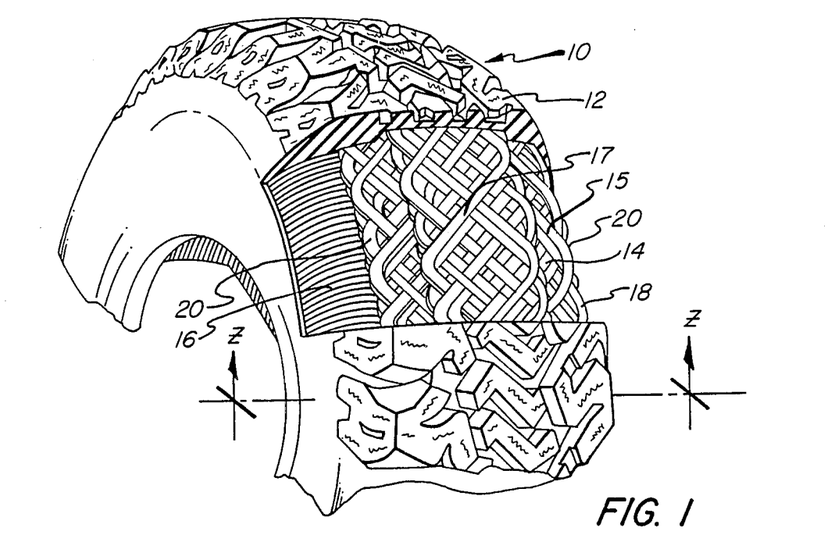
FIG. 1 is a perspective view of a tire, partially broken away to show an endless tire reinforcing belt made according to the present invention in place in the tire.
Figure 2:
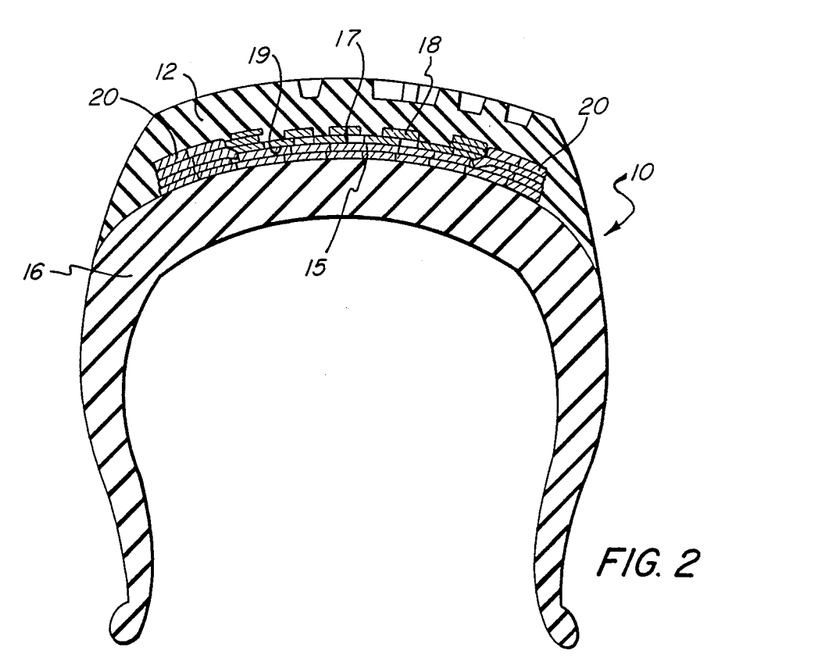
FIG. 2 is a partial sectional view taken along line z—z in FIG. 1.

The perspective drawing of FIG. 1 and the cross sectional view of FIG. 2 show such a tire 10 with a portion of the tread 12 thoroughLy removed to show the reinforcing belt 14 of the present invention positioned on top of a radial ply tire carcass 16. Reinforcing belt 14 has two main portions, a first portion 15 and a second, narrower portion 17 superposed on the first, wider portion. The first and second portions 15 and 17 are shown separated by the heavy line 19 in FIG. 2.

First belt portion 15 is shown in FIGS. 1 and 2 as being on the bottom, or next to the carcass 16, while second belt portion 17 is shown on top, or radially outward from said first belt portion. It is understood that the positions could also be reversed, with belt portion 17 on the bottom and belt portion 15 on the top.

Reference to FIG. 2 shows, in cross-section, the preferred arrangement of the reinforcing belt 14 with respect to the tread 12 and the tire carcass 16. The two belt portions of belt 14 are shown in cross section. The first portion 15 is placed on top of the tire carcass 16 and the second, narrower portion 17 is superposed on portion 15.

Figure 3:
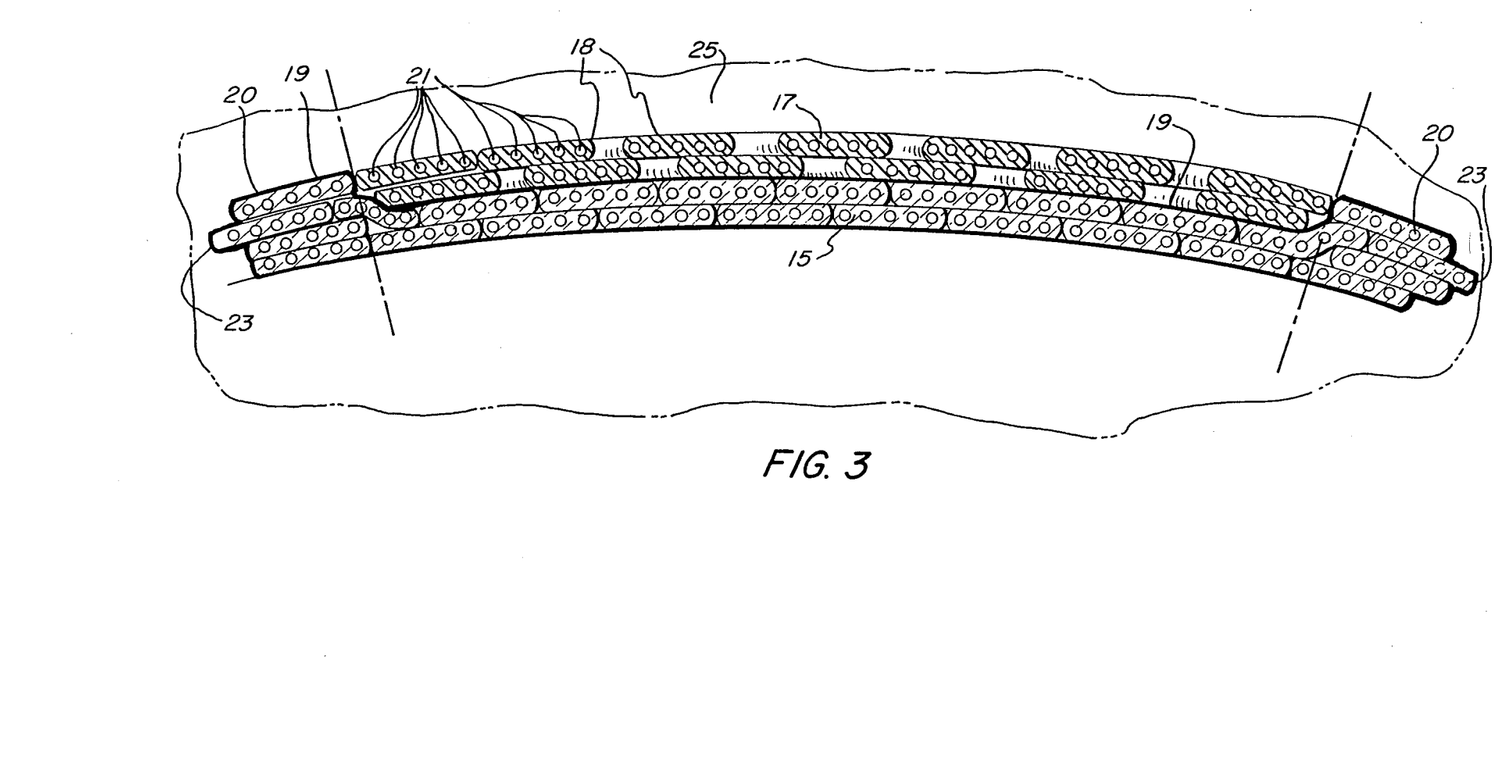
FIG. 3 is an enlargement of the cross-sectional view of the reinforcement belt shown in FIG. 2.

FIG. 3 shows in more detail a cross-sectional view of the reinforcing belt 14 of the present invention shown in FIGS. 1 and 2. It canbe seen from FIGS. 1, 2, and 3 that both the first and second portions 15 and 17 of the woven endless tire reinforcing belt 14 are composed of at least one coated continuous cord reinforcement strip 18, with preferably at least two strips 18. The strip 18 comprises a rubber exterior over a plurality of cords 21. Strips 18 are disposed in a zig-zag repeating pattern with succeeding lengths of the strip being displaced from each other. At the edges of the reinforcing belt are turns or reversals in the direction of winding, such as shown at 20. The lengths of cord reinforcement between the reversals are interleaved with lengths of cords disposed at an opposite angle along at least one line substantially parallel to and intermediate the edges of the reinforcing belt. This interleaving relationship results in a woven structure.

The basic woven structure for first belt portion 15 is well known in the prior art. One way of producing this woven structure is described in more detail in U.S. Pat. No. 4,600,456.

The individual continuous cord reinforcements 18 which are woven into the belt 14 are typically comprised of one or more tire cords 21 embedded in or coated with rubber. As used herein, the term "rubber" includes any suitable natural or synthetic material and any combination thereof, including any suitable polymeric materials. The cord may be of such materials as fiberglass, rayon, polyester, Aramid, nylon, cotton, steel, other metal or other similar types of cords. Most preferably, the coated continuous cord reinforcement will contain a plurality of parallel cords spaced evenly within a substantially uncured rubber coating.

The continuous cord reinforcement will contain cords of the type and at the spacing effective to achieve the performance characteristics desired for intended conditions of use. For truck or tractor tire constructions, the cords are typically polyester, Aramid, glass or steel cord material in a reinforcement strip about $\frac{1}{2}$ inch wide, which contains from six to twenty or more cords, preferably about eight or more cords across the width.

FIG. 3 shows the reinforcing belt 14 of the present invention in cross sectional detail, where the first portion 15 is separated from the second portion 17 by heavy line 19. As is seen most clearly in FIG. 3, the need for the second portion 17 arises because the cord reinforcements 18 build up at the edges or reversals 20 to make the first portion 15 thicker and therefore stiffer near the edges 23 than it is towards the center 25. This "dumbell" shaped profile can cause possibly greater tread wear towards the center of tire 10 than adjacent the edges. Weaving a narrower second belt portion 17 to fit in between the thicker edges and fill in the center area to provide a belt of more nearly equal thickness across its cross section stiffens the center belt portion to achieve more even wear pattern across the tire 10.

A further feature of the belt 14 of FIG. 3 is that the first belt portion 15 is a full, two ply woven belt with substantially one hundred percent coverage, while the second belt portion 17 is a two ply woven belt but with only substantially about forty percent coverage. It is understood that both belts could be one hundred percent coverage belts or even some other percentage; however, making the first belt portion a one hundred percent belt and the second, narrower belt a forty percent belt accomplishes the desirable stiffening of the center tread portion by using only about forty percent of the cord reinforcement for the second belt 17, thereby achieving a significant savings in the cost of materials. The method of weaving such a belt will be described in detail below.

Explanation of the present invention can best be achieved by reference to U.S. Pat. No. 4,600,456 and FIG. 1 thereof, which schematically represents the general type of apparatus used to weave the belts of the present invention. It is understood, however, that a variety of other apparatus can be used as well. This '456 patent is used solely for purposes of illustration.

As shown, the apparatus of the '456 patent includes a flexible endless weaving surface 22, which may be a multiple ply belt of reinforced rubber or of stainless steel having a thickness of from about 0.032 to 0.035 inches, upon which the coated continuous cord reinforcement strips 18 are laid to form the reinforcing belt. In other apparatus, for example, a weaving drum such as the general type described in U.S. Pat. No. 3,706,623 to Klein can be used instead of a weaving belt.

The apparatus of the '456 patent is capable of laying two coated continuous cord reinforcement strips on the endless weaving surface 24 simultaneously. The simultaneous laying of two cord reinforcements is currently the preferred mode of operation. However, the same principles apply regardless of the number of cord reinforcement strips employed, whether it be one or a greater plurality.

Each of the strips, 18 and 18' are supplied to the endless weaving surface 24 by independent reinforcement guide means shown generally as 38 and 38' because each of these means functions in the same manner, except for its movement being in mirrored relation to the other, the operation of only reinforcement guide means 38 will be described. Both of these reinforcement guide means can be simply and effectively moved in the requisite timed relationship to the movement of the weaving surface by operable engagement through gearing with variable speed DC motor 37 which is synchronized with motor 31 for the endless weaving surface. With regard to reinforcement guide means 38, this engagement is schematically indicated in the drawing. Other suitable control means can be used as well.

The relative speeds of motors 31 and 37 are synchronized by phase lock loop controller 33 and associated circuitry. The phase lock loop controller will preferably be of the high gain, high accuracy type and can be set to a desired ratio of speeds for the two motors by suitable means such as a digital thumbwheel switch 34. In the preferred embodiment, the speed of motor 37 will be monitored by encoder 35 which provides a reference signal to the phase lock loop controller 33 and the speed of motor 31 will be monitored by encoder 36 which provides a feedback signal to the controller 33. The corrected drum drive speed is then provided to motor 31 by the controller 33.

In operation, an individual coated continuous reinforcement strip 18 is fed through a suitably-shaped slot in alignment means 40 and then between counter-rotating rollers 42 and 44 which are oprable to lay the strip under pressure against endless weaving surface 24. The slot in member 44 receiving the strip 18 is maintained in its proper orientation with its length perpendicular to the direction of travel of the continuous weaving surface 24, by alignment control means which include an annular groove 46 on member 40 for receiving a control band 48 which is received in an annular groove 50 in control means 52 mounted on carriage 54.

The movement of the reinforcement guide means 38 back and forth in a direction generally transverse to the direction of movement of the endless weaving surface 24 is achieved by moving carriage 54 back and forth about guide rod 56. Cam follower 58 is attached to carriage 54 by means of connecting rod 60 and tracks the path of slide cam 62 in the cylindrical camming means 64 which is driven through operable engagement with motor 37.

The pattern on the coated continuous cord reinforcement strip within the endless tire reinforcing belt being formed is achieved by timing the movement of reinforcement guide means 38 with the movement of the endless weaving surface 24 as described above. The cord reinforcement is applied to the endless weaving surface in a zig-zag pattern, being positioned across the surface from one side to the other. The angle of the cord reinforcement strip to the edges of the belt is reversed and the lengths of the cord reinforcement between reversals are interleaved with lengths disposed at an opposite angle along at least one line substantially parallel to and intermediate the edges of the belt. The parameters of the belt are related according to empirical relationships, which are generally described in the following manner:

$$\frac{C \cdot \tan \cdot A}{2 \cdot W} = \frac{EPI \cdot C \cdot D \cdot \sin A}{P \cdot M \pm 1} = GR$$

wherein C is the circumference of the reinforcing belt, A is the smaller angle between the cord reinforcement and the edge of the reinforcement belt, W is the width of the reinforcing belt measured perpendicular to the edges, EPI is the number of cord reinforcements per inch measured perpendicular to the cord lengths, P is an integer and equal to one plus the total number of interleaving lines parallel to and intermediate the edges of the reinforcing belt, M and D are two integers having no common factor and which render ($P \cdot M + 1/D$) an integer with D being less than P, and D and P have no common factor, and GR is the number of repeating cycles of the cord reinforcement edge and back to the same edge for each circumference of the reinforcing belt.

This mathematical expression is, however, at best an approximation and does not hold true for all desired patterns when wound on the apparatus of the invention. There are several factors which make mathematical predictability difficult with this apparatus. Among these are, the changing effective radius and effective velocity of the forming surface. However, with the formula as a guide, the desired pattern can be obtained reproducibly through limited trial and error.

Figure 4:
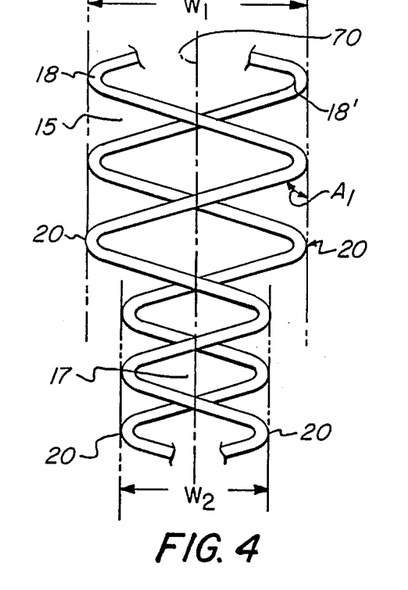
FIG. 4 is a schematic diagram illustrating one aspect of the belt of FIGS. 1, 2, and 3.

The endless belt of the present invention is woven by first weavIng a first belt portion of width $W_1$, as shown in FIG. 4, along center line 70. This first belt portion 15 can be of desired circumference $C_1$ as defined by the weaving belt or drum, angular orientation $A_1$, width $W_1$, and $GR_1$. These parameters are all related as defined by the above mathematical expression and can be set by appropriate inputs to the phase lock loop system.

After the desired number of repeating cycles $GR_1$ to weave a first belt portion 15 of desired thickness, the width of the belt is reduced by moving the reinforcement guide means 38 and 38' closer together to weave the second belt portion 17 having a narrower width $W_2$. The circumference $C_2$ of this second belt portion 17 is slightly different from $C_1$, increased only in relation to the added thickness of the first portion, although the variables $A_2$ and $GR_2$ may be changed, if desired, depending upon the input to the phase lock loop system. The second belt portion 17 is now woven to the desired thickness on the radially outward side of the first belt portion. The belt portion so woven is partially shown schematically in FIG. 4, at that point where the transition is made from the wider portion to the narrower portion. The second belt portion is placed adjacent the first belt portion to increase the thickness of belt 14 toward the center and render belt 14 of substantially uniform stiffness at every point across the cross section.

While FIG. 4 represents one preferred method of weaving the belt of the present invention, it is understood that other ways of accomplishing substantially the same structure are within the scope of the present invention. For example, the first belt portion 15 may be completed in some desired manner, and the second belt portion 17 can be woven at a different time by different apparatus in a different fashion using a different number of cord reinforcements, if desired. Any variety of such methods may be used, so long as the center portion of one belt is stiffened by adjacent positioning of another belt portion between the buildup at the edges.

$W_1$ is preferably in the range of substantially about 5 to 12 inches, with $W_2$ preferably being in the range of substantially about 4 to 11 inches. $W_1$ is preferably greater than $W_2$, although of course the narrower belt portion can be on the bottom. Additionally, the present invention is not limited to only two belt portions, but rather three or more belt portions having varying widths can be stacked to increase center thickness and achieve the desired degree of substantial uniformity of stiffness.

$A_1$ is preferably in the range of substantially about fifteen to forty degrees, with the especially preferred value being about twenty-one degrees. $A_2$ is preferably less than $A_1$. By reducing the angle $A_2$ for the second belt portion, the ability of the second belt portion to increase center portion stiffness is enhanced. The preferred range for $A_2$ is substantially about five to twenty degrees, the especially preferred value being about ten degrees.

Figure 6:
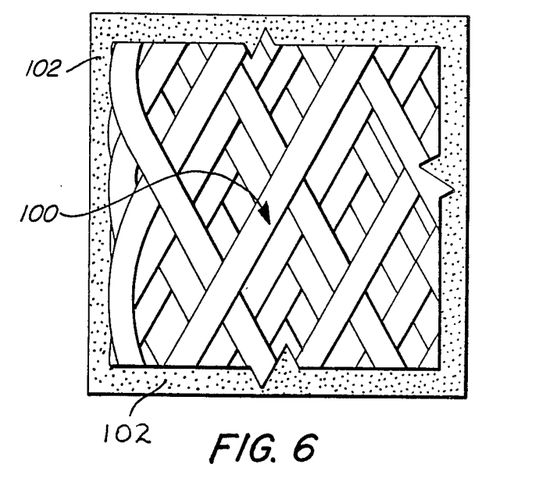
FIGS. 6 and 6A are top views of the first and second belt portions respectively of the reinforcing belt of FIGS. 1, 2, 3, and 4.

The mathematical expression set forth above for describing the relationship of the various belt parameters is designed to produce a belt of one hundred percent coverage as shown for example in FIG. 6. For purposes of illustration only, a belt portion 100 is shown placed over a background surface 102, such as tire carcass 16 shown in FIG. 1. It can be seen that belt portion 100 covers substantially one hundred percent of the surface 102 under the belt 100. If belt portion 100 is a 2-ply belt, then substantially about one hundred percent of surface 102 is covered at substantially every point under portion 100 by at least two layers of cord reinforcement 18. Of course, as already explained, the cord reinforcements double up to provide multiple thicknesses toward the edges.

Figure 6A:
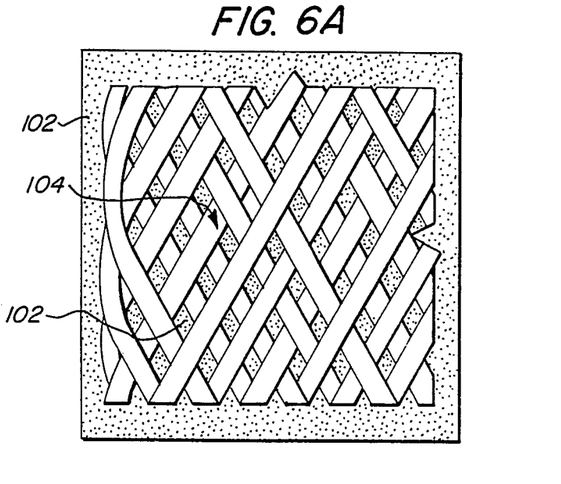

By contrast, FIG. 6A depicts a less than one hundred percent belt, such as for example a forth percent belt portion 104. It can be seen that belt portion 104 does not completely cover surface 102 under belt portion 104, but rather permits part of surface 102 to be seen through the interleaved cord reinforcements. If belt 104 covers only about forty percent of surface 102, belt 104 is referred to as a forty percent belt.

Such a forty percent belt, or other percentage belt, can be woven by setting up the weaving apparatus such as that shown in the '456 patent to weave a one hundred percent belt. The mathematical expression set forth above is designed to yield a one hundred percent belt. The inputs to the phase lock loop system and associated circuitry are set for a cord reinforcement having a strip width sufficient for a one hundred percent belt. However, the strip width actually used is only forty percent as wide as the machinery "thinks" it is. For example, the reinforcing strips 18 and 18' that are actually used are only about forty percent as wide as would be necessary for the weaving apparatus to weave a one hundred percent belt. Therefore, the weaving apparatus performs the operations necessary to weave a one hundred percent belt, but only a forty percent belt results. This accomplishes a significant savings in the amount of materials used, but provides a second belt portion that achieves adequate stiffening of the center portions of the belt.

It is understood that the second belt portion can also be any percentage in the range up to one hundred percent. The lower limit is approximately twenty-five percent, and the preferred coverage is substantially about forth percent.

Figure 5:
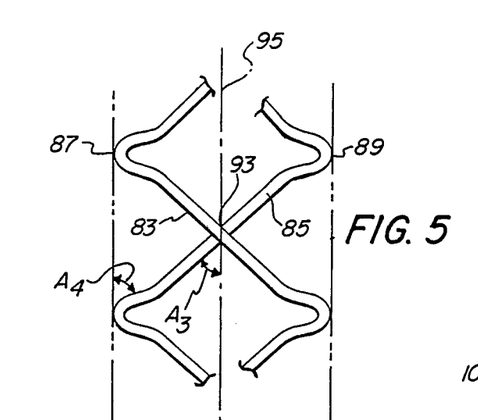
FIG. 5 is a schematic diagram illustrating another weave pattern for another endless tire reinforcing belt made in accordance with the present invention.
Figure 5A:
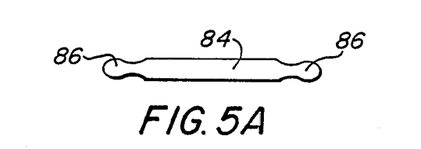
FIG. 5A is a schematic of an end cross-sectional view of the belt of FIG. 5.

FIGS. 5 and 5A show yet another pattern, also with two interwoven reinforcing strips 83 and 85. In the pattern of FIGS. 5 and 5A, the cord angle is changed adjacent the edges. This illustrates increasing the angle $A_3$ of the strips toward the center line 95 of the belt and decreasing the cord angle $A_4$ near the edge of the belt to increase build-up of material in that area 84, resulting in a reduced thickness in areas 86 adjacent the belt edges. The lengths of reinforcement strips 83 and 85 between reversals 87 and 89 are interleaved with lengths disposed at an opposite angle as illustrated at point 93 along at least one line such as center line 95. This is another method or weave pattern that reduces the effect of edge buildup.

In accordance with the present invention, it is possible to improve the performance characteristics of the tire by tailoring the characteristics of the first and second belt portions by independently changing the percentage of coverage, the belt angles, and the belt portion widths. One particularly preferred way of doing this is to adjust the overall belt stiffness by adding a desired second belt portion as described herein.

The above description is for the purpose of teaching the person of ordinary skill in the art how to practice the present invention. This description is not intended to described in detail each and every modification of the invention. Applicants do intend, however, to include all such modifications and variations within the scope of the invention which is defined by the following claims.

I claim:

1. A method for weaving an endless tire reinforcing belt of a predetermined circumference from coated continuous cord reinforcement on an endless weaving surface comprising:
   (a) supporting an endless weaving surface having a perimeter effective to produce a reinforcing belt of predetermined circumference and a width greater than that of the reinforcing belt to be woven about at least one support member rotatable about an axis;
   (b) forming a first belt portion by laying a first portion of coated continuous cord reinforcements on said endless weaving surface in a zig-zag pattern having a width $W_1$ from edge to edge, said cord being positioned in timed relation with said support members across said surface from one side to the other, at an angle to the edges of the belt with reversals at the edges, and lengths of said cord reinforcement between reversals being interleaved with lengths disposed at an opposite angle along at least one line substantially parallel to and intermediate the edges of said belt being formed, said belt having a thickness in the areas of said edges greater than the belt thickness between said edges; and
   (c) after said first belt portion has been formed, reducing the width $W_1$ to width $W_2$ and continuing to lay said reinforcement in a similar zig-zag pattern onto said weaving surface and superimposed onto the radially outward side of said first belt portion, thereby forming a second belt portion superimposed onto said first belt portion to fit between said edges of said first belt portion, whereby said reinforcing belt has increased uniform stiffness from edge to edge.

2. The method of claim 1, wherein said first portion of cord reinforcements is laid on said endless weaving surface by positioning said cord in timed relation with said support members across said surface, the parameters of said first belt portion being defined approximately by the mathematical expression $$\frac{C_1 \cdot \tan \cdot A_1}{2 \cdot W_1} = \frac{EPI \cdot C_1 \cdot D \cdot \sin A_1}{P \cdot M \pm 1} = GR_1,$$

wherein $C_1$ is the circumference of the reinforcing belt, $A_1$ is the smaller angle between the cord reinforcement and the edge of the belt portion, $W_1$ is the width of the belt portion measured perpendicular to the edges, EPI is the number of cord reinforcements per inch measured perpendicular to the cord lengths, P is an integer and equal to one plus the total number of interleaving lines parallel to and intermediate the edges of the belt portion, M and D are two integers having no common factor and which render (P·M+1/D) an integer with D being less than P, and D and P have no common factor, $GR_1$ is the number of repeating cycles of the cord reinforcement from the edge and back to the same edge for each circumference of the first belt portion, to thereby form a first belt portion of substantially one hundred percent coverage; and said second belt portion is formed in accordance with said mathematical expression, except that said second portion is woven as though a cord reinforcement of a predetermined width is being used, when in fact a cord reinforcement of only forty percent of said predetermined width is used, to thereby produce a second belt portion having about forty percent coverage of the first belt portion under the scond belt portion.

3. A method for weaving an endless tire reinforcing belt of a predetermined circumference from coated continuous cord reinforcement on an endless weaving surface comprising:

(a) supporting an endless weaving surface having a perimeter effective to produce a reinforcing belt of predetermined circumference and a width greater than that of the reinforcinng belt to be woven about at least one support member rotatable about an axis;

(b) forming a first belt portion by laying a first portion of coated continuous cord reinforcements on said endless weaving surface in a zig-zag pattern having a width $W_1$ from edge to edge, said cord being positioned in timed relation with said support members across said surface from one side to the other, at an angle to the edges of the belt with reversals at the edges, and lengths of said cord reinforcement between reversals being interleaved with lengths disposed at an opposite angle along at least one line substantially parallel to and intermediate the edges of said belt being formed; and (c) after said first belt portion has been formed, reducing the width $W_1$ to width $W_2$ and continuing to lay said reinforcement in a similar zig-zag pattern onto said weaving surface and superimposed onto the radially outward side of said first belt portion, thereby forming a second belt portion superimposed onto said first belt portion, said second belt portion being woven onto said first belt portion to cover only approximately forty percent of said first belt portion overlaid by said second belt portion, whereby said reinforcing belt has increased uniform stiffness from edge to edge.

4. A woven tire reinforcing belt for a pneumatic tire, said belt comprising:

(a) a first belt portion having a width $W_1$, said first belt portion comprising at least one coated continuous cord reinforcement woven in a zig-zag pattern across said first belt portion from one lateral side to the opposite lateral side of said first belt portion at an angle to the edge of said first belt portion, said first belt portion forming areas of increased thickness adjacent said sides relative to a belt region between said sides; and (b) at least one additional belt portion having a width $W_2$, said additional belt portion comprising at least one coated continuous cord reinforcement woven in a zig-zag pattern, said additional belt portion being positioned adjacent said first belt portion and substantially centered therewith, said $W_2$ being less than $W_1$ for fitting in between said areas of increased thickness, whereby said endless tire reinforcing belt has increased uniformity of thickness and stiffness from one edge to the other.

5. The belt of claim 4 comprising said first belt portion and a second belt portion, wherein the width $W_2$ of said second belt portion is less than the width $W_1$ of said first belt portion, and said second belt portion is woven onto the radially outward side of said first belt portion.

6. The belt of claim 5, wherein said first belt portion is woven from two coated continuous cord reinforcements, and said second belt portion is further woven in a substantially similar zig-zag pattern by samd said two continuous cord reinforcements.

7. The belt of claim 6, wherein said first belt portion has a second belt portion woven onto said first belt portion, said second belt portion having a width $W_2$ less than the width $W_1$ of said first belt portion, said belt further comprising:

(a) said first belt portion having width $W_1$, and circumference $C_1$, said first belt portion being formed by weaving said coated continuous cord reinforcement in said zig-zag pattern across said first belt portion from one lateral side to the opposite lateral side of said first belt portion at an angle $A_1$ to the edges of said belt portion being formed with reversals at the edges and lengths of said cord reinforcement between reversals being interleaved with lengths disposed at an opposite angle along at least one line substantially parallel to and intermediate the edges of said belt portion, the parameters of said belt portion being defined approximately by the mathematical expression $$\frac{C_1 \cdot \tan \cdot A_1}{2 \cdot W_1} = \frac{EPI \cdot C_1 \cdot D \cdot \sin A_1}{P \cdot M \pm 1} = GR_1,$$

wherein $C_1$ is the circumference of the reinforcing belt, $A_1$ is the smaller angle between the cord reinforcement and the edge of said first belt portion, $W_1$ is the width of said first belt portion measured perpendicular to the edges, EPI is the number of cord reinforcements per inch measured perpendicular to the cord lengths, P is an integer and equal to one plus the total number of interleaving lines parallel to and intermediate the edges of said first belt portion, M and D are two integers having no common factor and which render (P·M±1/D) an integer with D being less than P, and D and P have no common factor, $GR_1$ is the number of repeating cycles of the cord reinforcement from the edge and back to the same edge for each circumference of said first belt portion; and (b) said second belt portion having $W_2$ and circumference $C_2$, which is slightly different from $C_1$, being formed by weaving said reinforcement onto said second belt portion in substantially the same zig-zag pattern as said first belt portion with parameters approximately defined by said mathematical expression, except that $W_2$ is less than $W_1$, said second belt portion being positioned substantially in the middle of said first belt portion.

8. The belt of claim 5, wherein said first belt portion has a second belt portion woven onto said first belt portion, said second belt portion having a width $W_2$ less than width $W_1$ of said first belt portion, said belt further comprising:

(a) said first belt portion being at least two plies thick and having width $W_1$ and circumference $C_1$, said first belt portion being formed by weaving said coated continuous cord reinforcement in said zig-zag pattern across said first belt portion from one lateral side to the opposite lateral side of said first belt portion at an angle $A_1$ to the edges of said first belt portion being formed with reversals at the edges and lengths of said cord reinforcement between reversals being interleaved with lengths disposed at an opposite angle along at least one line substantially parallel to and intermediate the edges of said first belt portion, the parameters of said first belt portion being defined approximately by the mathematical expression $$\frac{C_1 \cdot \tan \cdot A_1}{2 \cdot W_1} = \frac{EPI \cdot C_1 \cdot D \cdot \sin A_1}{P \cdot M \pm 1} = GR_1,$$

wherein $C_1$ is the circumference of said first belt portion, $A_1$ is the smaller angle between the cord reinforcement and the edge of said first belt portion, $W_1$ is the width of said first belt portion measured perpendicular to the edges, EPI is the number of cord reinforcements per inch measured perpendicular to the cord lengths, P is an integer and equal to one plus the total number of interleaving lines parallel to and intermediate the edges of said first belt portion, M and D are two integers having no common factor and which render (P·M±1/D) an integer with D being less than P, and D and P have no common factor, $GR_1$ is the number of repeating cycles of the cord reinforcement from the edge and back to the same edge for each circumference of said first belt portion, therefore forming said first belt portion being at least two plies thick at substantially every point encompassed by said edges; and (b) said second belt portion being substantially two plies thick and having $W_2$ and circumference $C_2$, which is slightly different from $C_1$, being formed by weaving said reinforcement onto said second belt portion in substantially the same zig-zag pattern as said first belt portion except that $W_2$ is less than $W_1$ and the second belt portion covers only substantially about forty percent of that part of said first belt portion under said second belt portion, said second belt portion being positioned substantially in the middle of said first belt portion.

9. A pneumatic tire including the reinforcement belt of claim 4, 5, 6, 7, or 8.

10. The belt of claim 4, 5, 6, 7, or 8, wherein the cord reinforcement comprises at least one cord and is covered with rubber.

11. The belt of claim 7 or 8, wherein said second belt portion is formed by weaving said coated continuous cord reinforcement in said zig-zag pattern across said second portion from one side to the other of said belt portion at an angle $A_2$ to the edges of the belt portion, and $A_1$ is greater than $A_2$.

12. The belt of claim 11, wherein $A_1$ is in the range of substantially about fifteen to forty degrees and $A_2$ is in the range of substantially about five to twenty degrees.

13. The belt of claim 12, wherein $A_1$ is about twenty-one degrees and $A_2$ is about ten degrees.

14. A woven endless tire reinforcing belt comprising at least two belt portions, said belt comprising:

(a) a first endless belt reinforcement portion which comprises a unitary strip including a multiplicity of continuous cords, the strip being positioned across a width $W_1$ of the reinforcement from one lateral side to the opposite lateral side at an angle to the edges of the reinforcement in a plurality of wraps with successive lengths of the strip being folded with respect to each other at the edges in a generally zig-zag pattern to form a first belt portion of substantially uniform thickness, with the cords of said unitary strip being in contiguous relationship throughout the entire length of said unitary strip, said lateral first portion having lateral sides of increased thickness relative to a belt region between said sides; and (b) a second endless belt reinforcement portion joined to said first belt portion, said second belt portion comprising the said unitary strip further being positioned across a width $W_2$, less than said width $W_1$, of the second reinforcement portion from one lateral side to the opposite lateral side at an angle to the edges of said second reinforcement in a plurality of wraps with successive lengths of the strip being folded with respect to each other at the edges in a generally zig-zag pattern to form a second belt portion increasing the thickness of said reinforcing belt where said second belt portion overlies said first belt portion and fits substantially between said lateral sides of increased thickness, whereby said reinforcing belt is of increased uniform thickness and stiffness from edge to edge thereof.

15. The woven endless tire reinforcing belt of claim 14, wherein said second belt portion covers only a predetermined percentage of said first belt portion under said second portion, said predetermined percentage being substantially in the range from between twenty-five percent to one hundred percent.

16. A pneumatic tire comprising the tire reinforcing belt of either claim 14 or 15.

17. A woven tire reinforcing belt for a pneumatic tire, said belt comprising:

(a) a first belt portion having a width $W_1$ in the range of substantially about 5 to 12 inches, said first belt portion comprising at least one coated continuous cord reinforcement woven in a zig-zag pattern across said first belt portion from one lateral side to the opposite lateral side of said first belt portion at an angle to the edge of said first belt portion; and (b) a second belt portion having a width $W_2$, said second belt portion being woven onto the radially outward side of said first belt portion, said width $W_2$ being less than $W_1$ and being in the range of substantially about 4 to 11 inches, said second belt portion comprising at least one coated continuous cord reinforcement woven in a zig-zag pattern, said additional belt portion being positioned adjacent said first belt portion and substantially centered therewith, whereby said endless tire reinforcing being has increased uniformity of stiffness from one edge to the other.

18. The belt of claim 17, wherein said first belt portion is woven from two coated continuous cord reinforcements, and said second belt portion is further woven in a substantially similar zig-zag pattern by same said two continuous cord reinforcements.

19. The belt of claim 18, wherein said first belt portion has a second belt portion woven onto said first belt portion, said belt further comprising:

(a) said first belt portion having width $W_1$, and circumference $C_1$, said first belt portion being formed by weaving said coated continuous cord reinforcement in said zig-zag pattern across said first belt portion from one lateral side to the opposite lateral side of said first belt portion at an angle $A_1$ to the edges of said belt portion being formed with reversals at the edges and lengths of said cord reinforcement between reversals being interleaved with lengths disposed at an opposite angle along at least one line substantially parallel to and intermediate the edges of said belt portion, the parameters of said belt portion being defined approximately by the mathematical expression $$\frac{C_1 \cdot \tan \cdot A_1}{2 \cdot W_1} = \frac{EPI \cdot C_1 \cdot D \cdot \sin A_1}{P \cdot M \pm 1} = GR_1,$$

wherein $C_1$ is the circumference of the reinforcing belt, $A_1$ is the smaller angle between the cord reinforcement and the edge of said first belt portion, $W_1$ is the width of said first belt portion measured perpendicular to the edges, EPI is the number of cord reinforcements per inch measured perpendicular to the cord lengths, P is an integer and equal to one plus the total number of interleaving lines parallel to and intermediate the edges of said first belt portion, M and D are two integers having no common factor and which render $(P \cdot M \pm 1/D)$ an integer with D being less than P, and D and P have no common factor, $GR_1$ is the number of repeating cycles of the cord reinforcement from the edge and back to the same edge for each circumference of said first belt portion; and (b) said second belt portion having $W_2$ and circumference $C_2$ being formed by weaving said reinforcement onto said second belt portion in substantially the same zig-zag pattern as said first belt portion with parameters approximately defined by said mathematical expression, except that $W_2$ is less than $W_1$, said second belt portion being positioned substantially in the middle of said first belt portion.

20. The belt of claim 17, said belt further comprising:

(a) said first belt portion being at least two plies thick and having width $W_1$ and circumference $C_1$, said first belt portion being formed by weaving said coated continuous cord reinforcement in said zig-zag pattern across said first belt portion from one lateral side to the opposite lateral side of said first belt portion at an angle $A_1$ to the edges of said first belt portion being formed with reversals at the edges and lengths of said cord reinforcement between reversals being interleaved with lengths disposed at an opposite angle along at least one line substantially parallel to and intermediate the edges of said first belt portion, the parameters of said first belt portion being defined approximately by the mathematical expression $$\frac{C_1 \cdot \tan \cdot A_1}{2 \cdot W_1} = \frac{EPI \cdot C_1 \cdot D \cdot \sin A_1}{P \cdot M \pm 1} = GR_1,$$

wherein $C_1$ is the circumference of said first belt portion, $A_1$ is the smaller angle between the cord reinforcement and the edge of said first belt portion, $W_1$ is the width of said first belt portion measured perpendicular to the edges, EPI is the number of cord reinforcements per inch measured perpendicular to the cord lengths, P is an integer and equal to one plus the total number of interleaving lines parallel to and intermediate the edges of said first belt portion, M and D are two integers having no common factor and which render $(P \cdot M \pm 1/D)$ an integer with D being less than P, and D and P have no common factor, $GR_1$ is the number of repeating cycles of the cord reinforcement from the edge and back to the same edge for each circumference of said first belt portion, therefore forming said first belt portion being at least two plies thick at substantially every point encompassed by said edges; and (b) said second belt portion being substantially two plies thick and having $W_2$ and circumference $C_2$, which is slightly different from $C_1$, being formed by weaving said reinforcement onto said second belt portion in substantially the same zig-zag pattern as said first belt portion except that $W_2$ is less than $W_1$ and the second belt portion covers only substantially about forty percent of that part of said first belt portion under said second belt portion, said second belt portion being positioned substantially in the middle of said first belt portion.

21. A woven endless tire reinforcing belt comprising at least two belt portions, said belt comprising:

(a) a first endless belt reinforcement portion which comprises a unitary strip including a multiplicity of continuous cords, the strip being positioned across a width $W_1$ of the reinforcement from one lateral side to the opposite lateral side at an angle to the edges of the reinforcement in a plurality of wraps with successive lengths of the strip being folded with respect to each other at the edges in a generally zig-zag pattern to form a first belt portion of substantially uniform thickness, with the cords of said unitary strip being in contiguous relationship throughout the entire length of said unitary strip; and (b) a second endless belt reinforcement portion joined to said first belt portion, said second belt portion comprising the said unitary strip further being positioned across a width $W_2$, less than said width $W_1$, of the second reinforcement portion from one lateral side to the opposite lateral side at an angle to the edges of said second reinforcement in a plurality of wraps with successive lengths of the strip being folded with respect to each other at the edges in a generally zig-zag pattern to form a second belt portion increasing the thickness of said reinforcing belt where said second belt portion overlies said first belt portion, said second belt portion covering only substantially about forty percent of said first belt portion under said second portion, whereby said reinforcing belt is of increased uniform stiffness from edge to edge thereof.

22. A woven endless tire reinforcing belt comprising at least two belt portions, said belt comprising:
(a) a first endless belt reinforcement portion which comprises a unitary strip including a multiplicity of continuous cords, the strip being positioned across a width $W_1$ of the reinforcement from one lateral side to the opposite lateral side at an angle to the edges of the reinforcement in a plurality of wraps with successive lengths of the strip being folded with respect to each other at the edges in a generally zig-zag pattern to form a first belt portion of substantially uniform thickness, with the cords of said unitary strip being in contiguous relationship throughout the entire length of said unitary strip, said first belt portion being substantially a two ply belt at least two strips thick at substantially each point encompassed by the edges thereof; and
(b) a second endless belt reinforcement portion joined to said first belt portion, said second belt portion comprising the said unitary strip further being positioned across a width $W_2$, less than said width $W_1$, of the second reinforcement portion from one lateral side to the opposite lateral side at an angle to the edges of said second reinforcement in a plurality of wraps with successive lengths of the strip being folded with respect to each other at the edges in a generally zig-zag pattern to form a second belt portion increasing the thickness of said reinforcing belt where said second belt portion overlies said first belt portion, said second belt portion being positioned radially outward of said first portion and woven onto said first belt portion, and said second belt portion covers approximately forty percent of said first belt portion under said second belt portion, whereby said reinforcing belt is of increased uniform stiffness from edge to edge thereof.

* * * * *